(12) United States Patent
Jacquin et al.

(10) Patent No.: US 12,105,806 B2
(45) Date of Patent: Oct. 1, 2024

(54) SECURING COMMUNICATIONS WITH SECURITY PROCESSORS USING PLATFORM KEYS

(71) Applicant: HEWLETT PACKARD ENTERPRISE DEVELOPMENT LP, Houston, TX (US)

(72) Inventors: Ludovic Emmanuel Paul Noel Jacquin, Bristol (GB); Thomas M. Laffey, Roseville, CA (US); Darrell Haskell, Houston, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 281 days.

(21) Appl. No.: 17/585,646

(22) Filed: Jan. 27, 2022

(65) Prior Publication Data
US 2023/0237155 A1    Jul. 27, 2023

(51) Int. Cl.
*G06F 21/57* (2013.01)
*G06F 21/72* (2013.01)
*H04L 9/08* (2006.01)

(52) U.S. Cl.
CPC .......... *G06F 21/572* (2013.01); *G06F 21/575* (2013.01); *G06F 21/72* (2013.01); *H04L 9/0825* (2013.01)

(58) Field of Classification Search
CPC ...... G06F 21/572; G06F 21/575; G06F 21/72; H04L 9/0825
See application file for complete search history.

(56) References Cited

U.S. PATENT DOCUMENTS

| | | | | |
|---|---|---|---|---|
| 6,584,565 B1* | 6/2003 | Zamek | ................ | H04L 9/3263 713/157 |
| 7,069,434 B1* | 6/2006 | Ilnicki | ................ | H04L 9/0825 713/168 |

(Continued)

OTHER PUBLICATIONS

NPL Search History (Year: 2024).*

(Continued)

*Primary Examiner* — Samson B Lemma
*Assistant Examiner* — Richard W Cruz-Franqui
(74) *Attorney, Agent, or Firm* — Trop, Pruner & Hu, P.C.

(57) ABSTRACT

A computer platform includes a security processor; at least one hardware processor; and a memory. The security processor stores data representing a private platform key. The private platform key is part of an asymmetric pair of keys, and the asymmetric pair of keys includes a public platform key. The memory stores a firmware image. The firmware image includes data representing a root certificate of a public key infrastructure that signs a second certificate that is associated with the computer platform. The second certificate includes the public platform key and binding information binding the second certificate to the computer platform. The firmware image includes instructions that, when executed by the hardware processor(s), cause the hardware processor(s) to access data representing the second certificate and determine whether the second certificate is valid based on the root certificate and the binding information. The instructions, when executed by the hardware processor(s), further cause the hardware processor(s) to, responsive to determining that the second certificate is valid, use the public platform key to secure communication with the security processor.

20 Claims, 8 Drawing Sheets

(56) References Cited

U.S. PATENT DOCUMENTS

| | | | | |
|---|---|---|---|---|
| 7,069,439 | B1* | 6/2006 | Chen | G06F 21/57 380/255 |
| 7,552,433 | B2* | 6/2009 | Brothers | G06F 9/465 707/999.203 |
| 7,574,593 | B2* | 8/2009 | Mayfield | G06F 9/4403 713/1 |
| 7,986,786 | B2* | 7/2011 | Ibrahim | H04L 9/0825 713/193 |
| 8,209,542 | B2* | 6/2012 | Kumar | G06F 21/57 713/193 |
| 9,052,861 | B1* | 6/2015 | Pizot | H04L 63/102 |
| 9,275,230 | B2* | 3/2016 | Ali | G06F 21/572 |
| 2001/0010076 | A1* | 7/2001 | Wray | H04L 9/0841 715/205 |
| 2003/0200440 | A1* | 10/2003 | England | G06F 21/6218 713/179 |
| 2003/0200450 | A1* | 10/2003 | England | G06F 21/6218 713/181 |
| 2005/0010757 | A1* | 1/2005 | Bosler | H04L 9/3263 713/156 |
| 2005/0060545 | A1* | 3/2005 | Mont | H04L 9/0847 713/165 |
| 2006/0101286 | A1* | 5/2006 | Catherman | G06F 21/57 713/193 |
| 2008/0130893 | A1* | 6/2008 | Ibrahim | G06F 21/572 380/277 |
| 2008/0163383 | A1* | 7/2008 | Kumar | G06F 21/57 726/29 |
| 2009/0327741 | A1* | 12/2009 | Zimmer | G06F 21/575 713/2 |
| 2011/0280402 | A1* | 11/2011 | Ibrahim | G06F 21/572 713/189 |
| 2017/0249229 | A1* | 8/2017 | Walton | G06F 11/3447 |
| 2019/0089545 | A1* | 3/2019 | Dias Correa | H04L 63/126 |
| 2019/0228384 | A1* | 7/2019 | Williams | G06Q 10/06393 |
| 2019/0278913 | A1* | 9/2019 | Ndu | H04L 9/0841 |

OTHER PUBLICATIONS

Search History (Year: 2024).*
Trusted computing group, "Trusted Platform Module Library," Part 1: Architecture, Nov. 8, 2019, pp. 306.

* cited by examiner

SECURING COMMUNICATIONS WITH SECURITY PROCESSORS USING PLATFORM KEYS

BACKGROUND

A computer platform may be subject to a security attack in which a rogue entity seeks to access information that is stored on the computer platform or harm components of the computer platform. For purposes of preventing security attacks or at least inhibiting the degree of potential harm inflicted by security attacks, the computer platform may have different levels of protection. For example, the computer platform may have various mechanisms to limit access, such as firewalls, passwords, keys, and so forth. As another example, the computer platform may have a secure cryptographic processor, which may provide a number of security-related features for the computer platform. The security-related features may, for example, be used to ensure that the computer platform consistently behaves in expected ways and prove that the computer platform is trustworthy.

DETAILED DESCRIPTION

Figure 1:
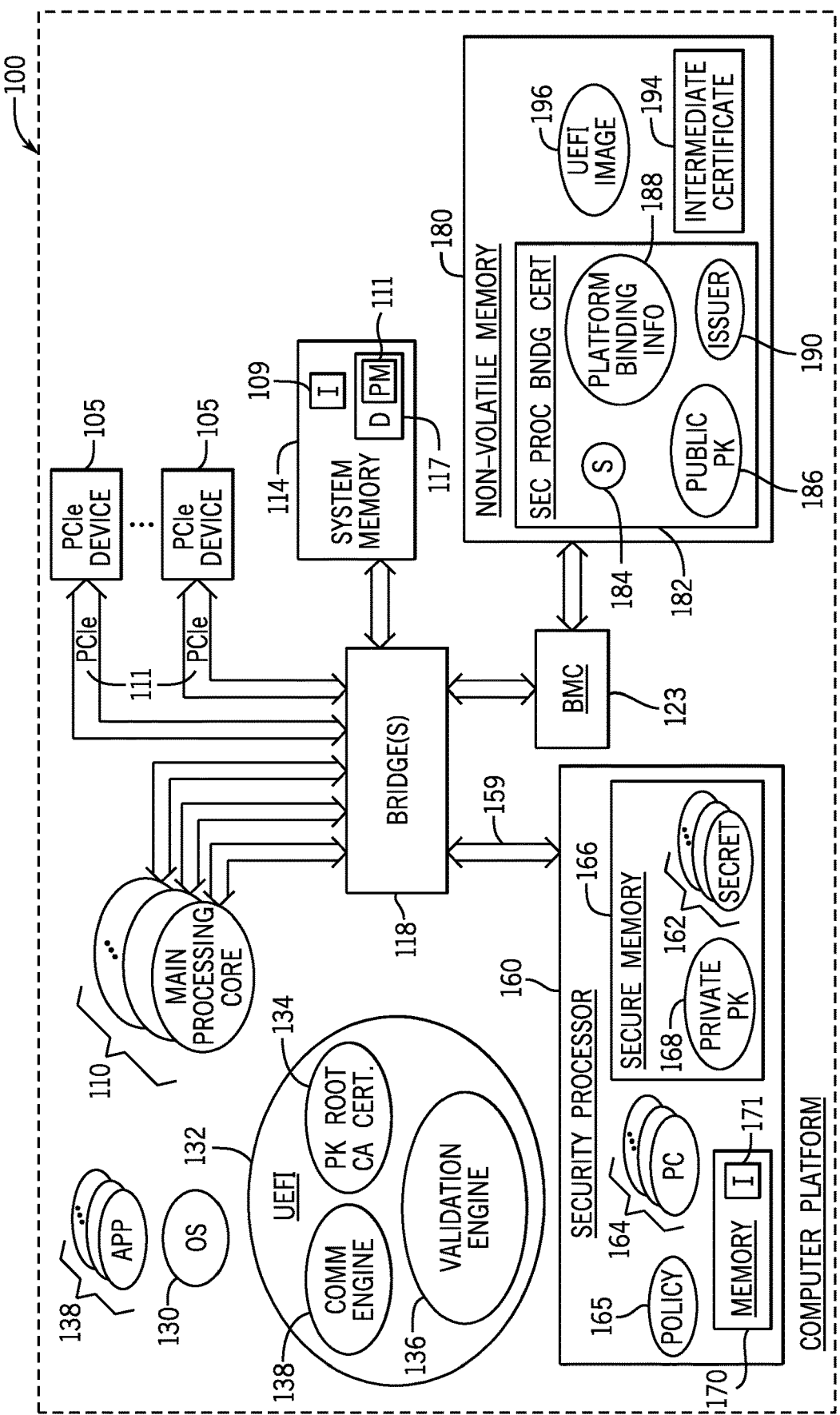
FIG. 1 is a schematic diagram of a computer platform having features to secure communications with a security processor using a platform key according to an example implementation.

A secure cryptographic processor, or security processor, for a computer platform may provide trusted computing operations for the computer platform for purposes of ensuring that the computer platform consistently behaves in expected ways. As examples of trusted computing operations, the security processor may generate cryptographic keys; store security artifacts (e.g., cryptographic keys and certificates); access security artifacts; erase security artifacts; store integrity measurement digests; provide signed integrity measurement digests for remote attestation; encrypt data; decrypt data; seal cryptographic keys to certain integrity measurement digest states (e.g., bind a key encrypting key of a storage device to a set of integrity measurements); unseal cryptographic keys; provide nonces for cryptographic communications; sign certificates; provide random or pseudorandom numbers; and so forth. The trusted computing operations may also include operations to configure the security processor and operations to own the security processor. A trusted platform module, or "TPM," is an example of a security processor.

Requests that are submitted to the security processor and responses that are provided by the security processor may be communicated over a security processor bus. The security processor bus may potentially be subject to eavesdropping. Such eavesdropping may reveal sensitive or confidential information of the computer platform, such as cryptographic keys, authorization passwords, and so forth.

One solution to inhibit, if not prevent, eavesdropping on the security processor bus is to wrap the communications over the bus with a cryptographic session key. For example, a caller, or requestor, for a service that is provided by the service processor may generate a symmetric session key and distribute the session key to the service processor so that communications over the service processor bus may be encrypted by the session key. For purposes of the requestor distributing the session key to the service process, the requestor may first generate a random or pseudorandom value, called a "salt." The salt may be used by the requestor as an input to a specific algorithm to generate a corresponding session key. In accordance with example implementations, the salt may be one part of a seed to generate the session key using the specific algorithm, and the other parts of the seed may be known. The requestor may encrypt the salt with a public key (or "public part") of an asymmetric cryptographic key (also called an "asymmetric key pair") and send the encrypted salt to the service processor. Because the security processor has the private key (or "private part") of the asymmetric key, the security processor may decrypt the salt and use the salt as an input to the same algorithm to produce the session key for use by the security processor.

One approach to distribute the session key as described above is to use an asymmetric endorsement key. The endorsement key may be part of the endorsement hierarchy of the security processor. This way of distributing a session key may be unavailable for platform firmware, however, due to the operating system having control of the endorsement hierarchy (to the exclusion of the platform firmware). Moreover, the endorsement key may not be tied, or bound, to a specific computer platform.

In accordance with example implementations that are described herein, platform firmware may secure communications with a security processor using a secure communication session whose session key is distributed using an asymmetric platform key. The asymmetric platform key may be part of a platform hierarchy of the security processor, and the asymmetric platform key may include two parts: a private platform key (stored securely in the security processor) and a public platform key.

The public platform key may be contained in a certificate. Before the platform firmware uses the public platform key provided by the certificate to distribute the session key, the platform firmware first validates the certificate, i.e., the platform determines whether the certificate is trusted. In accordance with example implementations, the platform firmware performs a two-part validation of the certificate. In the first part of the validation, the platform firmware validates the signature of the public key infrastructure (PKI) that signed the certificate. The PKI includes a certificate chain of trust that begins with a root certificate authority (CA) certificate (or "root certificate") that is part of the platform firmware; includes zero, one or multiple intermediate certificates; and ends with the certificate that contains the public platform key.

In accordance with example implementations, the certificate that includes the public platform key also includes platform binding information that binds the specific computer platform to the security processor (as the security processor has the corresponding private platform key). With the binding information being part of the certificate, the manufacturer may bind the security processor to the platform identity by signing the certificate. A certificate that includes a public platform key and platform binding information is referred to herein as a "security processor binding certificate."

The second part of the two-part validation involves the platform firmware validating the platform binding information that is contained in the security processor binding certificate. As its name implies, the binding information binds the security processor binding certificate to the specific computer platform. For example, in accordance with some implementations, the binding information sets forth an inventory for the computer platform, such as, for example, information specific to the computer platform, such as a serial number of the computer platform, identifiers for hardware components of the computer platform, identifiers for software components of the computer platform, hashes of software components on the computer platform, and so forth. The platform firmware may compare a platform manifest (i.e., an inventory obtained by the platform firmware) to the inventory that is represented by the binding information. In accordance with example implementations, if the two inventories match, then the security processor binding certificate passes the second part of the two-part validation.

Referring to FIG. 1, as a more specific example, in accordance with some implementations, a computer platform 100 includes a security processor 160 and one or multiple main processing cores 110 (i.e., hardware processors, such as central processing unit (CPU) processing cores, graphic processing units (GPUs) and so forth). The computer platform 100, in accordance with example implementations, may be a modular unit, which includes a frame, or chassis. Moreover, this modular unit may include hardware that is mounted to the chassis and is capable of executing machine-executable instructions. A blade server is an example of the computer platform 100, in accordance with an example implementation. The computer platform 100 may, however, be any of number of different platforms other than a blade server, in accordance with further implementations, such as a rack-mounted server, standalone server, a client, a desktop, a smartphone, a wearable computer, a networking component, a gateway, a network switch, a storage array, a portable electronic device, a portable computer, a tablet computer, a thin client, a laptop computer, a television, a modular switch, a consumer electronics device, an appliance, an edge processing system, a sensor system, a watch, a removable peripheral card, and so forth.

One or multiple main processing cores 110 of the computer platform 100 may execute machine-executable instructions 109 (stored in a system memory 114), which cause the main processing core(s) 110 to form various firmware and software components of the computer platform 100. For example, one or multiple main processing cores 110 may execute platform firmware instructions, such as platform firmware instructions that are derived from a Unified Extensible Firmware Interface (UEFI) image 196, for purposes of forming a UEFI 132. The UEFI 132 may provide pre-boot services and runtime services for the computer platform 100. In this context, a "pre-boot service" (also called a "boot service") refers to a service or function that is provided by the UEFI 132 after a power on or reset of the computer platform 100 and before control is transferred to an operating system 130. Pre-boot services may include such services as initializing hardware components such as the main processing cores 110 and the system memory 114; loading and executing drivers in a certain order to initialize the computer platform 100; performing hardware and software security checks; loading a bootloader for the operating system 130; validating and loading drivers from I/O peripherals, such as Peripheral Component Interconnect express (PCIe) devices 105; and so forth. The "runtime services" refer to service provided by the UEFI 132 after control of the computer platform 100 has been passed to the operating system 130.

As part of providing the pre-boot and runtime services, the UEFI 132 may communicate with the security processor 160 for purposes of performing trusted computing operations, and these trusted computing operations may be potentially be vulnerable to eavesdropping on a security processor bus 159. For example, data representing platform secrets 162 that are stored in the security processor 160 may be potentially communicated over the security processor bus 159. As examples, the platform secrets 162 may include passwords, key encrypting keys that secure the data on storage drives (not shown) of the computer platform 100, and so forth. As an example, the security processor bus 159 may be a Serial Peripheral Interface (SPI) bus, an enhanced SPI bus, an Improved Inter-Integrated Circuit (I3C) bus or other bus, depending on the particular implementation. For purposes of preventing eavesdropping on the bus 159 from acquiring sensitive information (e.g., data representing secrets 162), communications over the bus 159 may be wrapped, or encrypted, using cryptographic session keys.

More specifically, in accordance with example implementations, communications over the bus 159 may occur in communication sessions with the security processor 160. In this context, a "session" (or "communication session") with the security processor 160 refers to a communication interchange between the security processor 160 and a caller (or "requestor"). As an example, a session may relate to the communication of data pertaining to a trusted computing operation and may involve a request (e.g., a request containing a command) from a caller, or requestor (e.g., the UEFI 132), and a corresponding response from the security processor 160. As examples, a session may include a requestor requesting a secret 162 from the security processor 160 and the security processor 160 providing the secret 162; a requestor requesting a platform configuration register (PCR) extension and the security processor 160 acknowledging the request; a requestor requesting to unseal a cryptographic key and the security processor 160 responding to the request; a requestor requesting to bind a cryptographic key to a particular PCR state and the security processor 160 responding to the request; a requestor requesting a random number and the security processor 160 providing the random number; and so forth.

In accordance with example implementations, a session may involve communications pertaining to a trusted computing operations that is described in the Trusted Platform Module Library Specification, Family 2.0, Level 00, Revision 01.59 (November 2019), published by the Trusted Computing Group (hereinafter called the "TPM 2.0 Specification"). In accordance with some implementations, a communication session may involve communications pertaining to a trusted computing operation that is not described in the TPM 2.0 Specification.

The data for a given communication session between the UEFI 132 and the security processor 16 may be encrypted using a symmetric session key that is generated by the UEFI 132 and distributed by the UEFI 132 to the security processor 160. In accordance with example implementations, the UEFI 132 uses an asymmetric cryptographic key (i.e., a key pair that includes a public key and a corresponding private key) to distribute the session key to the security processor 160 so that the security processor 160 may use the session key to encrypt and decrypt data communicated over the bus 159 during the session. In accordance with example implementations, the asymmetric key includes a public part, a public platform key 186, which is provided by a security processor binding certificate 182 and a private part, or private platform key 168, which is stored in the secure memory 166 of the security processor 160. The manufacturer of the computer platform 100, in accordance with example implementations, provisions the security processor 160 with the private platform key 168.

The UEFI image 196, in accordance with example implementations, contains data that represents a platform key root certificate authority (CA) certificate 134 (called the "platform key root certificate 134" herein), and as such, the platform key root certificate 134 is part of the UEFI 132. The platform key root certificate 134 is part of the PKI that signed the security processor binding certificate 182 (assuming validation by the UEFI 132). The platform key root certificate 134 is trusted by the UEFI 132 and forms the root of a certificate chain of trust, which is validated by the UEFI 132 as part of the first part of the UEFI's two-part validation of the security processor binding certificate 182. The certificate chain of trust includes the security processor binding certificate 182 at the end of the certificate chain of trust; the platform key root certificate 134 at the beginning of the certificate chain of trust; and zero, one or multiple intermediate certificates 194 between the platform key root certificate 134 and the security processor binding certificate 182. As depicted in FIG. 1, a persistent, or non-volatile memory 180 of the computer platform 100 may store data representing the security processor binding certificate 182, the UEFI image 196 and one or multiple intermediate certificates 194.

In the context herein, a "platform key" refers to a key that is part of a platform hierarchy of the security processor 160. A "hierarchy" in general, refers to a set of objects that are related and which may be managed as a group. The security processor 160 may have one or multiple hierarchies other than the platform hierarchy, such as a storage hierarchy and an endorsement hierarchy. The platform hierarchy, in accordance with example implementations, is used by the manufacturer of the computer platform 100, and platform firmware, such as the UEFI 132, owns the platform hierarchy.

In accordance with example implementations, during manufacturing of the computer platform 100, the manufacturer provisions the computer platform 100 with the security processor binding certificate 182 by storing data representing the security processor binding certificate 182 in the non-volatile memory 180. Moreover, the manufacturer may provision the security processor 160 with the private platform key 168. In accordance with example implementations, the security processor binding certificate 182 contains the public platform key 186 that corresponds to the private platform key 168.

In addition to the public platform key 186, the security processor binding certificate 182, in accordance with example implementations, contains a signature 184 and platform binding information 188. In accordance with some implementations, a security processor binding certificate validation engine 136 of the UEFI 132 performs a two-part validation of the security processor binding certificate 182. The first part of the validation is a signature-based validation in which the security processor binding certificate validation engine 136 validates the signature of the PKI that signed the security processor binding certificate 182. This validation includes validating the certificate chain of trust that ends with the security processor binding certificate 182 and begins with the platform key root certificate 134.

If the security processor binding certificate 182 passes the signature-based validation, then, in accordance with example implementations, the security processor binding certificate validation engine 136 performs the second part of the validation, which involves validating the security processor binding certificate 182 based on the platform binding information 188 that is contained in the certificate 182. In this manner, in accordance with some implementations, upon boot of the computer platform 100, the UEFI 132 may determine a platform inventory, or manifest 111, for the computer platform 100. As an example, the platform manifest 111 may, for example, contain a model of the computer platform 100, a serial number of the computer platform 100, identifiers for hardware components installed in the computer platform 100, identifiers or hashes for software components installed in the computer platform 100, and so forth. The security processor binding certificate validation engine 136 may compare the platform binding information 188 contained in the security processor binding certificate 182 to the platform manifest 111. If accordance with example implementations, if the inventory of the platform binding information 188 matches the inventory of the platform manifest 111, then the security processor binding certificate 182 passes the second part of the validation, and otherwise, the second part of the validation fails.

After validating the security processor binding certificate 182, the UEFI 132 may then use the public platform key 186 to distribute a salt to the security processor 160, so that the security processor 160 and UEFI 132 may use a session key that is generated from the salt. In accordance with some implementations, the UEFI 132 validates the security processor binding certificate 182 before each communication session with the security processor 160. In accordance with further implementations, the session key may be used for multiple sessions, and the UEFI 132 may validate the security processor binding certificate 182 before a set of multiple communication sessions with the security processor 160.

In accordance with example implementations, the UEFI 132 includes a communication engine 138, which performs functions related to the UEFI 132 communicating with the security processor 160. These functions may include, in accordance with example implementations, generating salts; encrypting the salts with the public platform key 186; communicating requests to set up secure communication sessions with the security processor 160; communicating the encrypted salts to the security processor 160; generating symmetric session keys using the salts as inputs; encrypting data using symmetric session keys; decrypting data using symmetric session keys; and so forth.

As depicted in FIG. 1, in accordance with example implementations, a baseboard management controller (BMC) 123 of the computer platform 100 may control access to the non-volatile memory 180. For example, in accordance with an example implementation, the platform key validation engine 136 may submit a request to the BMC 123 to read the security processor binding certificate 182, and in response to the request, the BMC 123 may provide data to the engine 136 representing the content of the security processor binding certificate 182.

The BMC 123, as part of its management plane, may perform various management roles for the computer platform 100, including monitoring sensors (e.g., temperature sensors, cooling fan speed sensors); monitoring operating system status; monitoring power statuses; logging computer system events; verification of the UEFI image 196 when the main processing core 110 instantiates the UEFI 132; and providing management functions, which may be controlled remotely by a remote management server. Moreover, the BMC 123 may allow operations to be performed when the computer platform 100 is powered down and before the operating system has booted; and the BMC 123 may be used to perform recovery operations after an operating system or computer system failure. In accordance with example implementations, the BMC 123 may include a network interface to communicate with a remote management server (not shown). In accordance with further implementations, the BMC 123 may communicate with the remote management server via passthrough communications through a PCIe device 105 of the computer platform 100.

The BMC 123 may, as part of its security plane, perform various security-related roles for the computer platform 100, such as validating BMC firmware before the firmware is executed by the BMC 123. The security-related roles may also include validating the UEFI image 196, after a power on or reset of the computer platform 100, before the firmware instructions contained in the UEFI image 196 are executed by the main processing core(s) 110. The security-related roles may include monitoring software measurements (operating system kernel measurements) to detect security issues. The security-related roles may include updating firmware. Moreover, as part of its security-related roles, the BMC 123 may measure an UEFI boot block and extend a PCR state stored in the security processor 160 with the measured UEFI boot state. The BMC 123 may perform any of a number of other security-related roles for the computer platform 100.

As used herein, a "BMC," or "baseboard management controller," is a specialized service processor that monitors the physical state of a server or other hardware using sensors and communicates with a management system through a management network. The baseboard management controller may also communicate with applications executing at the operating system level through an input/output controller (IOCTL) interface driver, a representational state transfer (REST) API, or some other system software proxy that facilitates communication between the baseboard management controller and applications. The baseboard management controller may have hardware level access to hardware devices that are located in a server chassis including system memory. The baseboard management controller may be able to directly modify the hardware devices. The baseboard management controller may operate independently of the operating system of the system in which the baseboard management controller is disposed. The baseboard management controller may be located on the motherboard or main circuit board of the server or other device to be monitored. The fact that a baseboard management controller is mounted on a motherboard of the managed server/hardware or otherwise connected or attached to the managed server/hardware does not prevent the baseboard management controller from being considered "separate" from the server/hardware. As used herein, a baseboard management controller has management capabilities for sub-systems of a computing device, and is separate from a processing resource that executes an operating system of a computing device. The baseboard management controller is separate from a processor, such as a central processing unit, which executes a high-level operating system or hypervisor on a system.

In accordance with further implementations, the security processor binding certificate 182 may be stored in a memory that is not accessed via a BMC. For example, in accordance with further implementations, data representing the security processor binding certificate 182 may be stored in a secure memory 166 of the security processor 160, and the security processor binding certificate validation engine 136 may request the security processor binding certificate 182 from the security processor 160.

In accordance with example implementations, the security processor 160 may be a Root of Trust for storing and a Root of Trust for reporting for the computer platform 100. In this context, a "Root of Trust device" or "RoT device," may be a device that behaves in an expected manner, as the RoT device's misbehavior may not be detectable. In other words, the RoT device may be inherently trusted software, hardware, or some combination thereof. A RoT device may include compute engines. The compute engine may be software operating using hardware in the RoT device, hardware of the RoT device, or some combination thereof. For example, a RoT device may include a Root of Trust for Storage (RTS). The RTS may be a compute engine capable of maintain an accurate summary of values.

The security processor 160, in accordance with example implementations, may be in the form of a semiconductor package (or "chip") that is mounted to a motherboard of the computer platform 100. The secure memory 166 of the security processor may store platform secrets 162, such as cryptographic keys, passwords, sealed cryptographic keys, passwords, certificates, public keys, private keys, and so forth. Moreover, the secure memory 166 may store data representing measurement digests. The security processor 160 may be designed according to industry standards to provide hardware-based, security functions while also resisting tampering and malicious software. In accordance with some implementations, the security processor 160 may be a TPM.

The security processor 160 may contain one or multiple processing cores 164 (i.e., hardware processors, such as CPU processing core) to perform functions for the security processor 160, such as performing trusted computing operations, constructing communication session keys based on information provided by the UEFI 132 (as described further herein), gating whether an entity other than the UEFI 132 may communicate with the security processor 160 using platform key-based secure communications, and so forth. In this manner, the processing core(s) 164 may execute machine-executable instructions 171 that are stored in a memory 170 of the security processor 160 to perform these functions. In accordance with further implementations, the security processor 160 may perform all or part of the functions using circuitry that does not execute machine-executable instructions, such as a field programmable gate array (FPGA), a complex programmable logic device (CPLD) or an application specific integrated circuit (ASIC).

In accordance with further implementations, the security processor 160 may be a virtual security processor that is formed by the execution of software or firmware. For example, in accordance with some implementations, the security processor 160 may be a virtual TPM (or "vTPM"), which may, for example, be provided by a hypervisor or other entity of the computer platform 100.

In accordance with example implementations, the system memory 114, non-volatile memory 180 and secure memory 166 are non-transitory storage media that may be formed from semiconductor storage devices, memristor-based storage devices, magnetic storage devices, phase change memory devices, a combination of devices of one or more of these storage technologies, and so forth. The system memory 114 may represent a collection of both volatile memory devices and non-volatile memory devices.

Among its other features, in accordance with example implementations, the computer platform 100 may include a bus infrastructure, I/O devices, and so forth. In accordance with example implementations, the bus infrastructure may include one or multiple bridges 118 that may be connected to the main processing cores 110, the system memory 114, PCIe devices 105, the BMC 123 and the security processor 160 for purposes of establishing communications among these components. In accordance with some implementations, the main processing cores 110 may include one or multiple semiconductor packages (or "chips"), and the main processing core 110 may include a north bridge 118 that includes a memory controller (for system memory 114 accesses) and PCIe root ports. The computer platform 100 may also include a south bridge 118 that provides I/O ports, such as Serial Advanced Technology Attachment (SATA) ports, Universal Serial Bus (USB) ports, Low Pin Count (LPC) ports, SPI ports, eSPI ports and so forth. In accordance with some implementations, the north bridge 118 may be part of the main processing cores 110. In accordance with further implementations, the north and south bridges may be combined into a single bridge 118; and in accordance with some implementations, this single bridge 118 may be part of the main processing cores 110.

Figure 2:
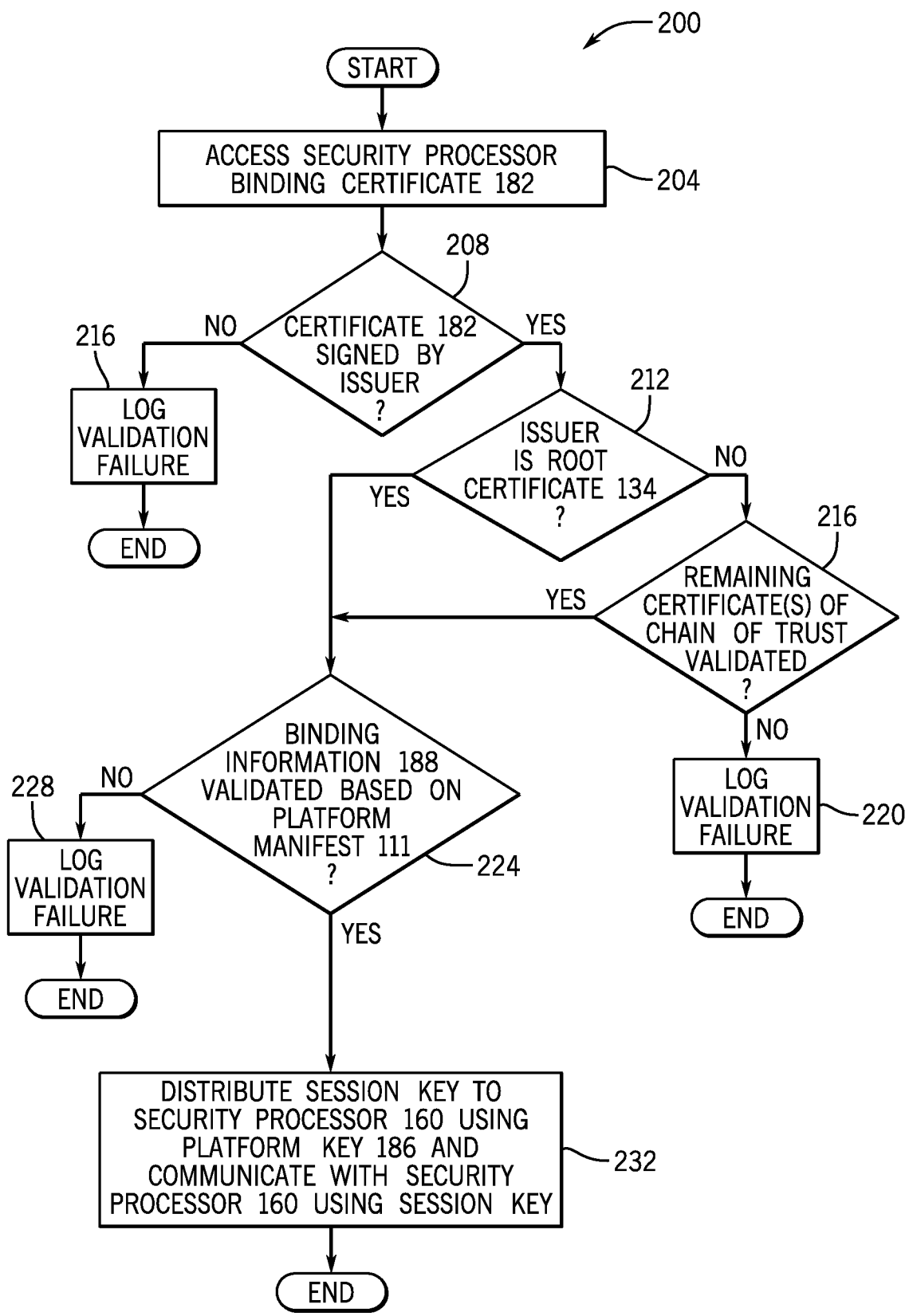
FIG. 2 is a flow diagram depicting a process to validate a security processor binding certificate based on a signature of the certificate and platform binding information contained in the certificate according to an example implementation.

FIG. 2 depicts a process 200 by the UEFI 132 to validate the security processor binding certificate 182 and communicate with the security processor 160 according to an example implementation. Referring to FIG. 2 in conjunction with FIG. 1, the process 200 includes the security processor binding certificate validation engine 136 of the UEFI 132 accessing the security processor binding certificate 182, pursuant to block 204. In accordance with example implementations, the security processor binding certificate validation engine 136 validates the security processor binding certificate 182. This validation, in accordance with example implementations, has two parts: a first part in which the security processor binding certificate validation engine 136 validates the security processor binding certificate 182 based on the chain of trust associated with the certificate 182; and a second part in which the security processor binding certificate validation engine 136 validates the binding information 188.

Regarding the first part of the validation, pursuant to the process 200, the security processor binding certificate validation engine 136 determines (decision block 208) whether the security processor binding certificate 182 is signed by the issuer 190 of the certificate 182. In this regard, the security processor binding certificate 182 identifies the issuer 190 of the certificate 182 and contains a signature 184 of the issuer. The issuer may be an intermediate certificate 194 or may be the platform key root certificate 134. For purposes of determining whether the security processor binding certificate 182 was signed by the issuer 190, the security processor binding certificate validation engine 136 may, for example, determine a hash of the content of the security processor binding certificate 182, decrypt the signature 184 using the public key of the issuer 190 and compare the decrypted signature to the hash to determine if these values match (i.e., validation passes) or do not match (i.e., validation fails). If the security processor binding certificate validation engine 136 determines, pursuant to decision block 208, that the security processor binding certificate 182 was not signed by the issuer 190, then the validation fails and the validation failure is logged, pursuant to block 216.

If, pursuant to decision block 208, the security processor binding certificate validation engine 136 determines that the security processor binding certificate 182 was signed by the issuer 190, and if the issuer 190 is the platform key root certificate 134 (decision block 212), then the validation based on the signature is complete. If the security processor binding certificate validation engine 136 determines, pursuant to decision block 212, that the issuer 190 is not the platform key root certificate 134, then the security processor binding certificate validation engine 136 determines (decision block 216) whether the remaining certificate(s) of the chain of trust are validated. In this manner, the security processor binding certificate validation engine 136 may, for each intermediate certificate, validate the signature of the certificate. If, pursuant to decision block 216, the security processor binding certificate validation engine 136 determines that the chain of trust has not been validated, i.e., the validation fails, then, pursuant to block 220, the security processor binding certificate validation engine 136 logs the validation failure.

Beginning with decision block 224, the security processor binding certificate validation engine 136 performs the second part of the validation, which involves the engine 136 determining whether the binding information 188 matches the platform manifest 111. As depicted in FIG. 1, the platform manifest 111 may be, for example, stored in a memory of the computer platform, such as the system memory 114, and represent an inventory of selected hardware and/or software components of the computer platform 100, a model of the computer platform 100, a serial number of the computer platform 100, and so forth. If the inventory represented by the manifest 111 is the same as the inventory represented by the binding information 188, then, in accordance with example implementations, the security processor binding certificate 182 passes validation. In accordance with some implementations, the security processor binding certificate validation engine 136 compares the two inventories by comparing a hash of the binding information 188 with a hash of the manifest 111. In this manner, in accordance with example implementations, if the two hashes are the same, then the validation passes. Otherwise, the validation fails, and the UEFI 132 logs the validation failure, pursuant to block 228.

Pursuant to block 232, with the security processor binding certificate 182 being validated, the UEFI 132 may proceed with communicating with the security processor 160 using a salted communication session that uses the asymmetric platform key pair to distribute the session key, as described herein.

In the context used herein, a "hash" (also called a "hash value" herein) is produced by the application of a cryptographic hash function to a value (e.g., an input, such as an image). A "cryptographic hash function" may be a function that is provided through the execution of machine-readable instructions by a processor (e.g., one or multiple central processing units (CPUs), one or multiple CPU processing cores, and so forth). The cryptographic hash function may receive an input, and the cryptographic hash function may then generate a hexadecimal string to match the input. For example, the input may include a string of data (for example, the data structure in memory denoted by a starting memory address and an ending memory address). In such an example, based on the string of data the cryptographic hash function outputs a hexadecimal string. Further, any minute change to the input may alter the output hexadecimal string. In another example, the cryptographic hash function may be a secure hash function (SHA), any federal information processing standards (FIPS) approved hash function, any national institute of standards and technology (NIST) approved hash function, or any other cryptographic hash function. In some examples, instead of a hexadecimal format, another format may be used for the string.

Figure 3:
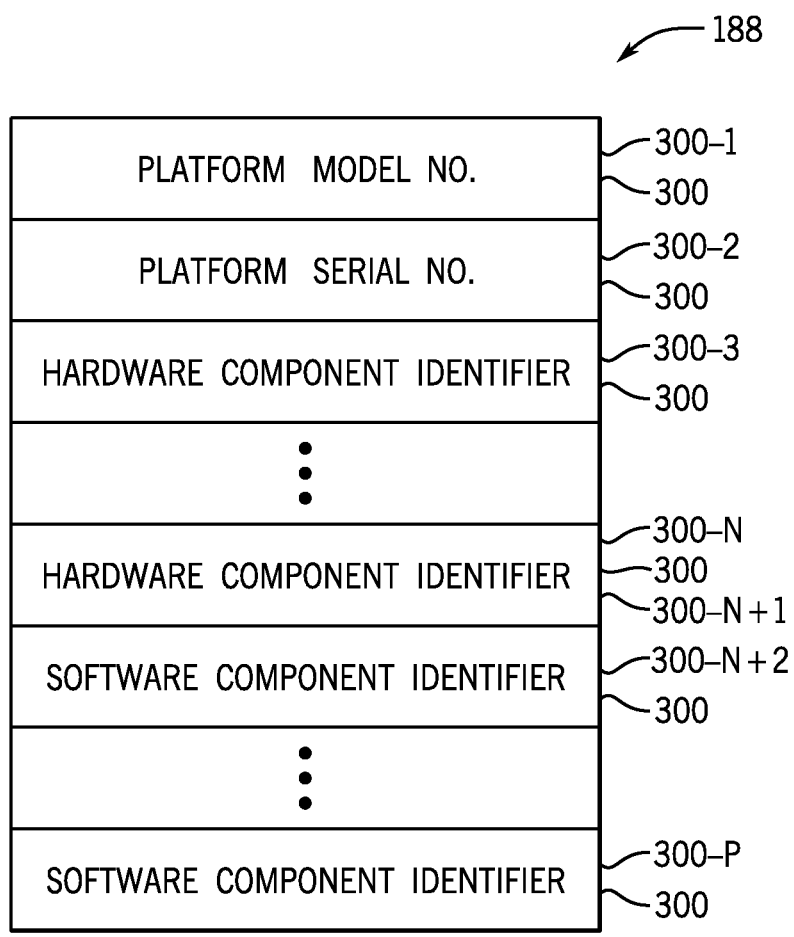
FIG. 3 is an illustration of binding information of a security processor binding certificate according to an example implementation.

FIG. 3 is an illustration of the binding information 188 in accordance with an example implementation. For this example, the binding information 188 includes specifically formatted fields 300 (P example fields 300-1 to 300-P being depicted in FIG. 1), where each field 300 is designated for identifying information corresponding to a particular component. For example, the field 300-1 may be for data representing a serial number of the computer platform 100 and another field 300-2 may be specifically designated for data representing a model identifier for the computer platform 100. Another field (e.g., field 300-3 or field 300-N) may be a hardware identifier, for a serial number for a particular type, or category, of a hardware component. As another example, another field (e.g., field 300-N+2 or field 300-P) may be designated for a particular hash value or version number of a particular software component (e.g., a boot loader, an operating system, and so forth). In accordance with example implementations, if a particular computer platform does not have a hardware or software component for a designated field 300 of the binding information 188, then, in accordance with example implementations, designated data identifying the absence of the component is placed in the field. In a similar manner, in constructing the manifest 111, the UEFI 132, in accordance with example implementations, adheres to the specifically designated fields 300 of the binding information 188. As such, in accordance with example implementations, the manifest 111 should be identical to the binding information 188, if the security processor 160 was specifically designated, by the manufacturer, to be in the specific computer platform 100.

Figure 4:
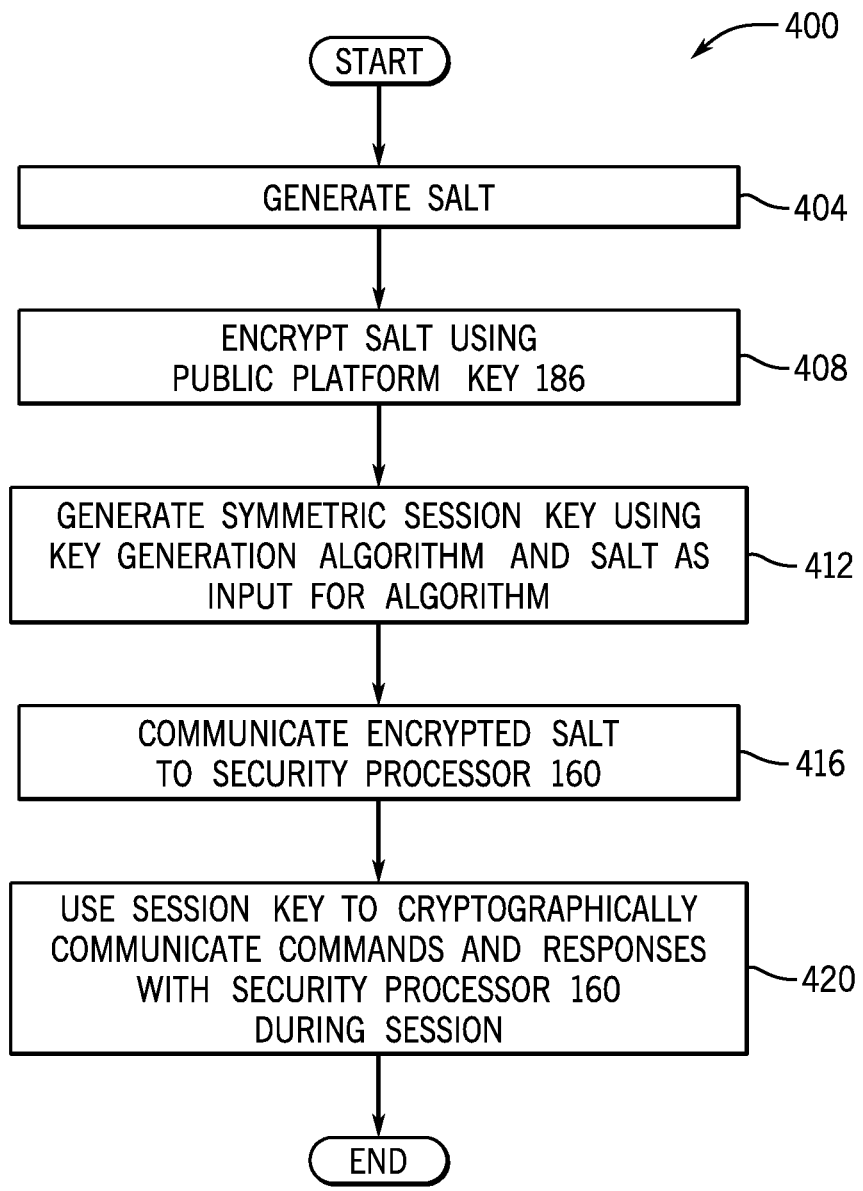
FIG. 4 is a flow diagram depicting a process performed by platform firmware to set up and use a secure communication session with a security processor according to an example implementation.

FIG. 4 depicts a process 400 used by the communication engine 138 of the UEFI 132 to set up and use a secure communication session to communicate with the security processor 160, in accordance with example implementations. Referring to FIG. 4 in conjunction with FIG. 1, pursuant to the process 400, the communication engine 138 generates (block 404) a salt. In accordance with an example implementation, the communication engine 138 may contain a pseudorandom or random number generator to generate the salt. In this context, a "pseudorandom number" may be a nearly random number, and in accordance with example implementations, the communication engine 138 may include a pseudorandom number generator. As an example, the pseudorandom number generator may be a seed-based generator, which provides a pseudorandom number at its output. For example, in accordance with some implementations, the communication engine 138 may include a polynomial-based pseudorandom number generator, which provides a pseudorandom number based on a seed value that serves as an input to a polynomial function. As examples, the seed value may be derived from a state or condition at the time the pseudorandom number is to be generated, such as, for example, input provided by a real time clock (RTC) value, a counter value, a measured noise value, a register value, and so forth. In accordance with further example implementations, the communication engine 138 may use an actual, or true, random number generator. This type of generator provides an output that represents a true random number. As an example, a true random number generator may include an analog-to-digital converter (ADC) that provides a random digital output; and the ADC may sample a truly random analog signal, such as a thermal noise signal (a Johnson-Nyquist noise signal that is provided by a resistor, for example, or an atmospheric noise signal that is received by an antenna).

Pursuant to block 408 of the process 400, the communication engine 138 encrypts the generated salt using the public platform key 186 and generates (block 412) a symmetric session key using a key generation algorithm and the salt as an input for the algorithm. The communication engine 138 then communicates (block 416) the encrypted salt to the security processor 160. It is noted that the security processor 160 may decrypt the salt using the private key of the platform asymmetric key pair, and use the salt as an input for the same key generation algorithm to produce the same session key for the security processor 160. With the communication engine 138 and the security processor 160 possessing the session key, the session key may then be used to cryptographically communicate commands and responses between the UEFI 132 and the security processor 160, pursuant to block 420.

Figure 5:
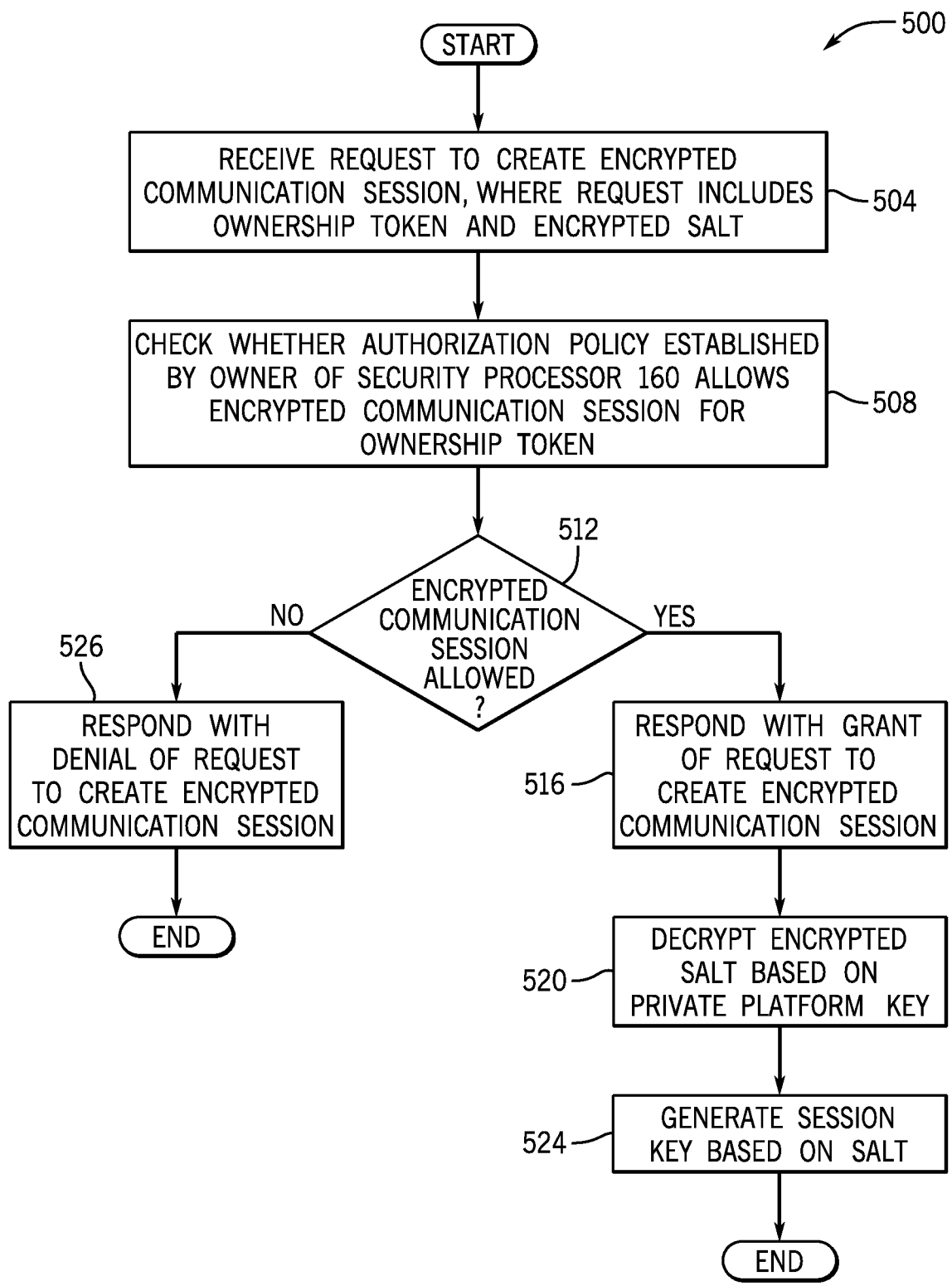
FIG. 5 is a flow diagram depicting a process of the security processor to gate use of the platform key for secure communications with the security processor according to an example implementation.

FIG. 5 depicts a process 500 used by the security processor 160 to control, or gate, availability of the platform key for cryptographic communications with the security processor 160. In this manner, entities other than the UEFI 132, such as an application 139 (FIG. 1) or an operating system 130 (FIG. 1) of the computer platform 100 may use the platform key-based secure communications described herein to communicate with the security processor 160, if authorized by an authorization policy 165 (FIG. 1). In this manner, in accordance with example implementations, the private platform key may be used by the UEFI 132 without any restrictions, while the security processor 160 may gate use of the private platform key by the operating system 130 and applications 139 if these entities are granted access to the security processor 160 on behalf of the owner of the computer platform 100 (i.e., using endorsement hierarchy authorization). Moreover, in accordance with example implementations, a further delegation policy may be used should the owner desire to authorize usage of the private platform key without disclosing the owner's endorsement authorization.

Referring to FIG. 5 in conjunction with FIG. 1, pursuant to the process 500, the security processor 160 receives (block 504) a request to create an encrypted communication session, where the request includes an ownership token and an encrypted salt. The ownership token, in turn, may be an index to the authorization policy 165, controlling use of the security processor 160 based on the ownership token. Pursuant to block 508, the security processor 160 checks whether the authorization policy 165 allows access to the security processor 160. If access is allowed, pursuant to decision block 512, then the security processor 160 responds (block 516) with a grant of the request to access the security processor 160, decrypts (block 520) the encrypted salt based on the private platform key 168 and communicates (block 524) with the entity using a secure communication session, as set forth herein. Otherwise, if, pursuant to decision block 512, access to the security processor 160 is denied, then the security processor 160 responds (block 526) with a denial of the request to access the security processor 160.

Other implementations are contemplated, which are within the scope of the appended claims. For example, in accordance with further implementations, a computer platform may have a different architecture than the architecture that is depicted in FIG. 1. For example, a computer platform, in accordance with a further implementation, may not include a BMC. As another example, a computer platform, in accordance with a further implementation, may have a BMC, but certificate-related content (e.g., a security processor binding certificate, intermediate certificates, and so forth) may be stored in a memory or storage, which is not behind the BMC. As another example, a computer platform, in accordance with a further implementation, may have a BMC, and certain content (e.g., a UEFI image) may be stored in a memory, which is behind a BMC, while other content (e.g., certificate content) may be stored in a memory or storage that is not behind a BMC. As another example, a computer platform, in accordance with a further implementation, may have a management controller other than a BMC, such as a platform controller or a chassis management controller. The computer platform, in accordance with further implementations, may be a platform other than a server, such as a client, a desktop, a smartphone, a wearable computer, a networking component, a gateway, a network switch, a storage array, a portable electronic device, a portable computer, a tablet computer, a thin client, a laptop computer, a television, a modular switch, a consumer electronics device, an appliance, an edge processing system, a sensor system, a watch, a removable peripheral card, and so forth.

Figure 6:
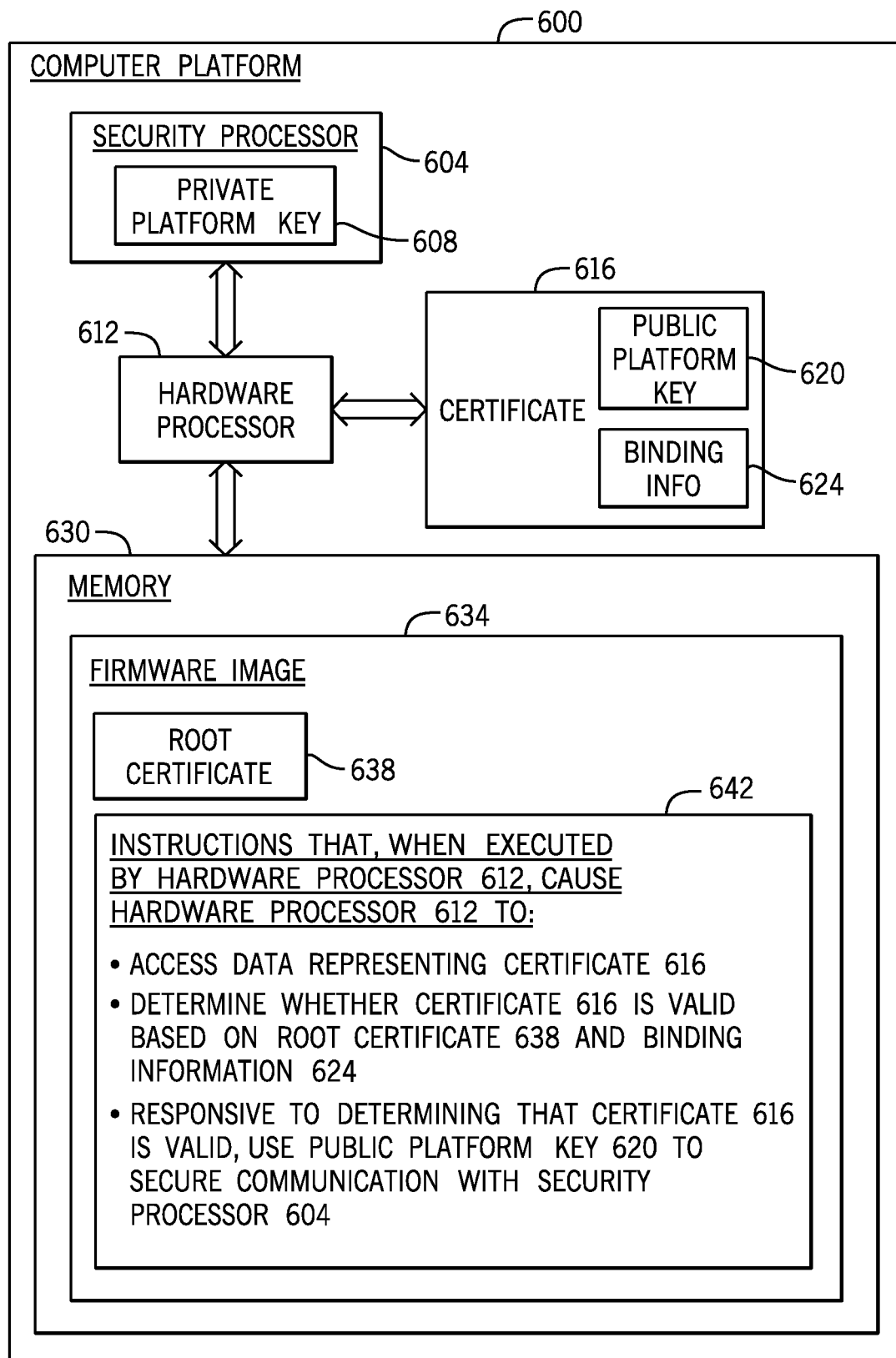
FIG. 6 is a schematic diagram of a computer platform that uses a public platform key to secure communication with a security processor of the computer platform according to an example implementation.

Referring to FIG. 6, in accordance with example implementations, a computer platform 600 includes a security processor 604; at least one hardware processor 612; and a memory 630. The security processor 604 stores data representing a private platform key 608. The private platform key 608 is part of an asymmetric pair of keys, and the asymmetric pair of keys includes a public platform key 620. The memory 630 stores a firmware image 634. The firmware image 634 includes data representing a root certificate 638 of a public key infrastructure that signs a certificate 616 that is associated with the computer platform 600. The certificate 616 includes the public platform key 620 and binding information 624 that binds the certificate 616 to the computer platform 600. The firmware image 634 includes instructions 642 that, when executed by the hardware processor(s), 612, cause the hardware processor(s) 612 to access data representing the certificate 616 and determine whether the certificate 616 is valid based on the root certificate 638 and the binding information 624. The instructions 642, when executed by the hardware processor(s) 612, further cause the hardware processor(s) 612 to, responsive to determining that the certificate 616 is valid, use the public platform key 620 to secure communication with the security processor 604.

Figure 7:
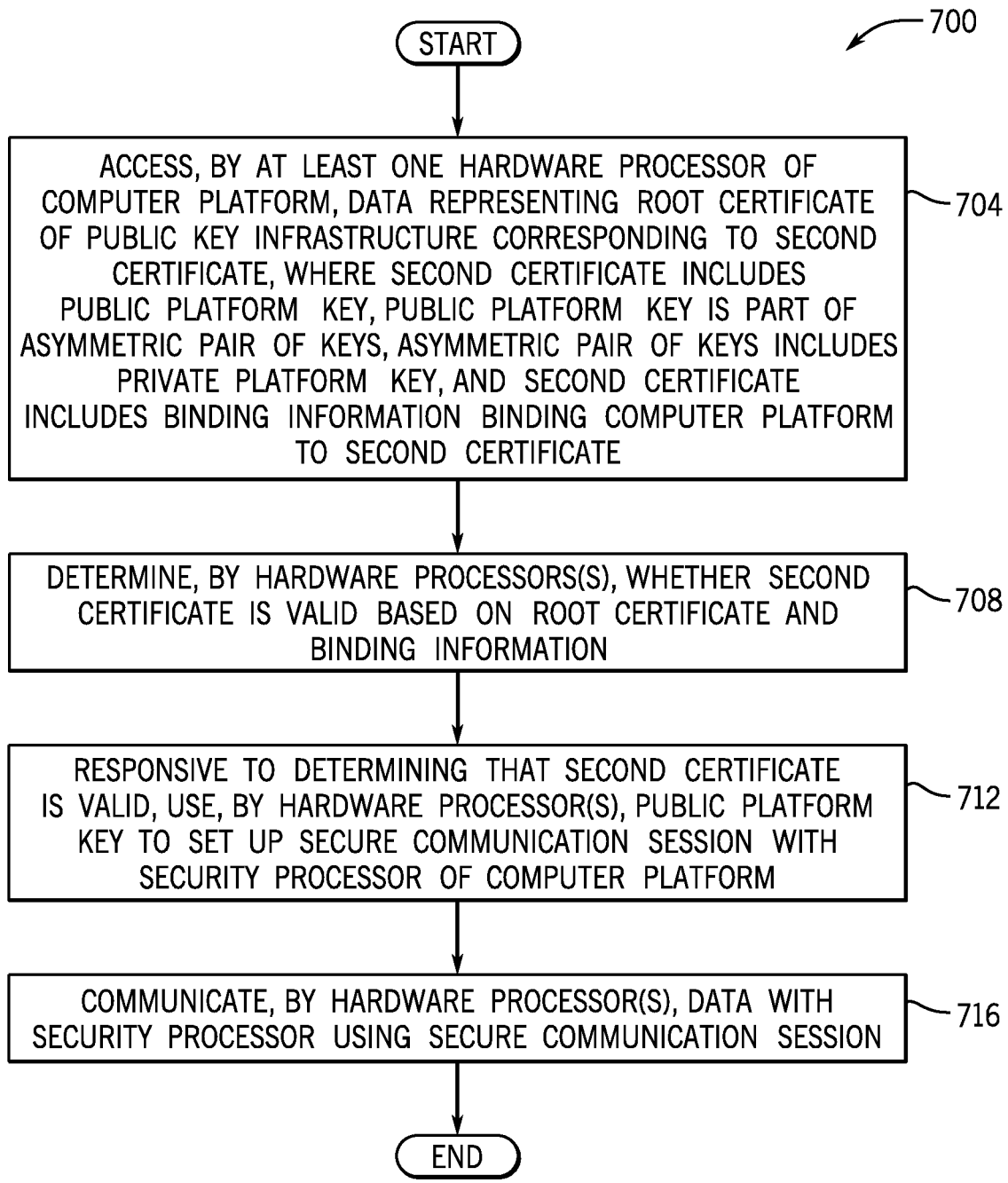
FIG. 7 is a flow diagram depicting a process to use a public platform key to set up a secure communication session with a security processor and communicate with the security processor using the secure communication session according to an example implementation.

Referring to FIG. 7, in accordance with example implementations, a process 700 includes accessing (block 704), by at least one hardware processor of a computer platform, data representing a root certificate of a public key infrastructure corresponding to a second certificate. The second certificate includes a public platform key, and the public platform key is part of an asymmetric pair of keys, which includes a private platform key. The second certificate includes binding information binding the computer platform to the second certificate. The process 700 includes determining (block 708), by the hardware processor(s), whether the second certificate is valid based on the root certificate and the binding information. Pursuant to block 712, responsive to determining that the second certificate is valid, the process 700 includes using, by the hardware processor(s), the public platform key to set up a secure communication session with a security processor of the computer platform. Pursuant to block 716, the process 700 includes communicating, by the hardware processor(s), data with the security processor using the secure communication session.

Figure 8:
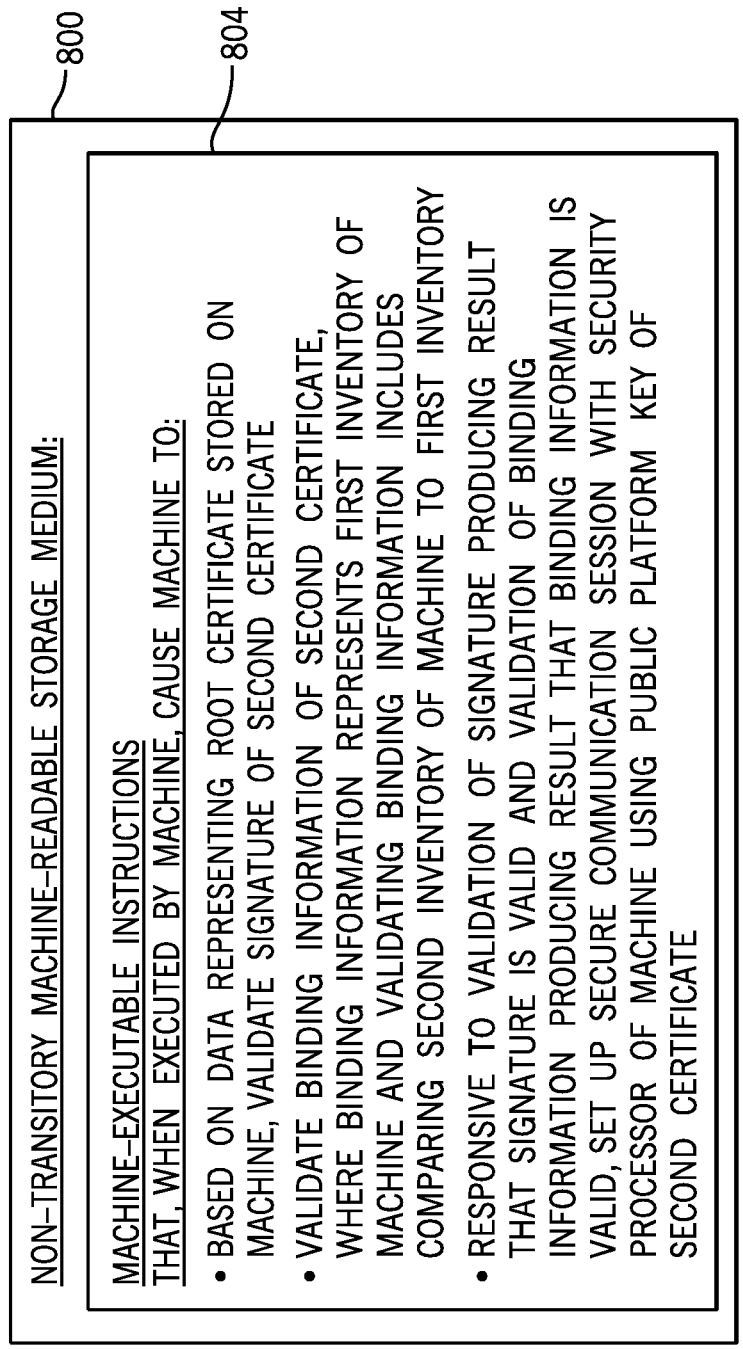
FIG. 8 is an illustration of machine-executable instructions stored on a machine-readable non-transitory storage medium that, when executed by a machine, cause the machine to set up a secure communication session with a security processor of the machine using a public platform key according to an example implementation.

Referring to FIG. 8, in accordance with example implementations, a non-transitory machine-readable storage medium 800 stores machine-executable instructions 804 that, when executed by a machine, cause the machine to, based on data representing a root certificate that is stored on the machine, validate a signature of a second certificate. The instructions 804, when executed by the machine, further cause the machine to validate binding information of the second certificate. The binding information represents a first inventory of the machine. Validating the binding information includes comparing a second inventory of the machine to the first inventory. The instructions 804, when executed by the machine, further cause the machine to, responsive to the validation of the signature producing a result that the signature is valid and the validation of the binding information producing a result that the binding information is valid, setting up a secure communication session with a security processor of the machine using a public platform key of the second certificate.

In accordance with example implementations, the binding information includes first data corresponding to a first inventory of the computer platform. The instructions, when executed by the hardware processor(s), further cause the hardware processor(s) to generate second data representing a second inventory of the computer platform. The instructions, when executed by the hardware processor(s), further cause the hardware processor(s) to validate the second certificate based on a comparison of the second data to the first data. A particular advantage is that a platform asymmetric key pair may be tied, or bound, to a specific computer platform.

In accordance with example implementations, the first data includes a first hash of data representing the first inventory, and the second data includes a second hash of data representing the second inventory. The instructions, when executed by the hardware processor(s), further cause the hardware processor(s) to determine whether the second hash is identical to the first hash. A particular advantage is that a platform asymmetric key pair may be tied, or bound, to a specific computer platform.

In accordance with example implementations, the binding information includes at least one of the following: a model number of the computer platform, a serial number of the computer platform, an identifier of a hardware component of the computer platform, or an identifier of a software component of the computer platform. A particular advantage is that a platform asymmetric key pair may be tied, or bound, to a specific computer platform.

In accordance with example implementations, the instructions, when executed by the hardware processor(s), further cause the hardware processor(s) to generate a salt; generate a session key based on the salt; and encrypt the salt based on the public platform key to provide an encrypted salt. The instructions, when executed by the hardware processor(s), further cause the hardware processor to communicate encrypted salt to the security processor; and use the session key in a communication session with the security processor. A particular advantage is that a platform asymmetric key pair may be tied, or bound, to a specific computer platform.

In accordance with example implementations, the instructions, when executed by the hardware processor(s), further cause the hardware processor(s) to provide pre-boot environment services and post-boot environment services for the computer platform. A particular advantage is that communications between platform firmware and a security processor may be secured.

In accordance with example implementations, the memory further stores other instructions that are associated with an operating system or an application of the computer platform. The hardware processor(s) executes the other instructions to further cause the hardware processor(s) to use the public platform key to secure communications with the security processor. A particular advantage is that communications between the operating system or application and the security processor may be secure.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A computer platform comprising:
  a security processor to store data representing a private platform key, wherein the private platform key is part of an asymmetric pair of keys, and the asymmetric pair of keys includes a public platform key;
  at least one hardware processor; and
  a memory to store a firmware image, wherein:
    the firmware image comprises data representing a root certificate of a public key infrastructure that signs a second certificate associated with the platform;
    the second certificate includes the public platform key and binding information binding the second certificate to the platform; and
    the firmware image corresponding to platform firmware and comprising instructions that, when executed by the at least one hardware processor, cause the at least one hardware processor to:
      access data representing the second certificate;
      determine whether the second certificate is valid based on the root certificate and the binding information; and
      responsive to determining that the second certificate is valid;
      generate a session key;
      distribute the session key to the security processor, wherein the distributing comprises communicating content with the security processor, and wherein the content is encrypted by the public platform key and is related to the session key; and
      in association with a session between the platform firmware and the security processor, communicate, with the security processor, data encrypted by the session key.

2. The computer platform of claim 1, wherein:
  the binding information comprises first data corresponding to a first inventory of the computer platform; and
  the instructions, when executed by the at least one hardware processor, further cause the at least one hardware processor to generate second data representing a second inventory of the computer platform, and validate the second certificate based on a comparison of the second data to the first data.

3. The computer platform of claim 1, wherein:
  the first data comprises a first hash of data representing the first inventory;
  the second data comprises a second hash of data representing the second inventory; and
  the instructions, when executed by the at least one hardware processor, further cause the at least one hardware processor to determine whether the second hash is identical to the first hash.

4. The computer platform of claim 1, wherein the binding information comprises at least one the following: a model number of the computer platform, a serial number of the computer platform, an identifier of a hardware component of the computer platform, or an identifier of a software component of the computer platform.

5. The computer platform of claim 1, wherein:
  the instructions, when executed by the at least one hardware processor, further cause the at least one hardware processor to:
    generate a salt;
    generate the session key based on the salt; and
    encrypt the salt based on the public platform key to provide an encrypted salt; and
  distributing the session key comprises communicating the encrypted salt to the security processor.

6. The computer platform of claim 1, wherein the instructions, when executed by the at least one hardware processor, further cause the at least one hardware processor to provide pre-boot environment services and post-boot environment services for the computer platform.

7. The computer platform of claim 6, wherein:
  the memory to further store other instructions associated with an operating system or an application of the computer platform; and
  the at least one hardware processor to execute the other instructions to further cause the at least one hardware processor to use the public platform key to secure communications with the security processor.

8. The computer platform of claim 7, wherein:
  the other instructions, when executed by the at least one hardware processor, to further cause the at least one hardware processor to communicate a request for a secure communication session to the security processor, wherein the request comprises an ownership token; and
  the security processor to determine, based on the ownership token and an authorization policy, whether to allow the secure communication session.

9. The computer platform of claim 1, wherein:
  the instructions, when executed by the at least one hardware processor, to further cause the at least one hardware processor to communicate a request for a secure communication session to the security processor, wherein the request comprises an ownership token; and
  the security processor to determine, based on the ownership token and an authorization policy, whether to allow the secure communication session.

10. The computer platform of claim 1, wherein the instructions, when executed by the at least one hardware processor, to further cause the at least one hardware processor to:

establish a secure communication session with the security processor using the public platform key; and in the secure communication session, communicate data representing a secret of the computer platform with the security processor.

11. The computer platform of claim 1, wherein the security processor comprises a trusted platform module.

12. A method comprising:

accessing, by at least one hardware processor of a computer platform, data representing a root certificate of a public key infrastructure corresponding to a second certificate, wherein the second certificate comprises a public platform key, the public platform key is part of an asymmetric pair of keys, the asymmetric pair of keys comprises a private platform key, and the second certificate comprises binding information binding the computer platform to the second certificate;

determining, by the at least one hardware processor, whether the second certificate is valid based on the root certificate and the binding information;

responsive to determining that the second certificate is valid, using, by the at least one hardware processor, the public platform key to set up a secure communication session between a requestor of a security service and a security processor of the computer platform providing the security service, wherein setting up the secure communication session comprises generating a session key for the secure communication session and distributing the session key to the security processor; and communicating, in the secure communication session, encrypted data between the requestor and the security processor, wherein the encrypted data comprises data encrypted by the session key.

13. The method of claim 12, further comprising:

communicating, by the at least one hardware processor, a request to set up the secure communication session with the security processor, wherein the request is associated with an ownership token; and determining, by the security processor, whether to allow the communication session based on application of an ownership policy to the ownership token.

14. The method of claim 12, further comprising:

executing platform firmware instructions to access the data representing the root certificate, determine whether the second certificate is valid, use the public platform key to set up the secure communication session, and communicate the data with the security processor using the secure communication session.

15. The method of claim 12, further comprising:

executing operating system instructions to access the data representing the root certificate, determine whether the second certificate is valid, use the public platform key to set up the secure communication session, and communicate the data with the security processor using the secure communication session.

16. The method of claim 12, further comprising:

storing a firmware image in a non-volatile memory of the computer platform, wherein the firmware image comprises the instructions and the root certificate.

17. A non-transitory, machine-readable storage medium that stores machine-executable instructions that, when executed by a machine, cause the machine to:

based on data representing a root certificate stored on the machine, validate a signature of a second certificate;

validate binding information of the second certificate, wherein the binding information represents a first inventory of the machine, and validating the binding information comprises comparing a second inventory of the machine to the first inventory; and responsive to the validation of the signature producing a result that the signature is valid and the validation of the binding information producing a result that the binding information is valid, setting up a secure communication session between a requestor of a security service and a security processor of the machine providing the service, wherein setting up the secure communication session comprises generating a session key for the secure communication session and distributing the session key to the security processor, and wherein data communicated between the requestor and the security processor in the secure communication session is encrypted by the session key.

18. The storage medium of claim 17, wherein the binding information comprises data representing at least one of the following: a serial number of the machine or a hash value associated with machine-executable instructions of the machine.

19. The storage medium of claim 17, wherein:

the instructions, when executed by the machine, further cause the machine to:

generate a salt;

generate the session key based on the salt; and encrypt the salt based on a public platform key of the second certificate to provide an encrypted salt; and distributing the session key comprises communicating the encrypted salt to the security processor.

20. The storage medium of claim 17, wherein the instructions are associated with at least one of a pre-boot firmware service or a post-boot firmware service.

* * * * *